(12) United States Patent
Thanu et al.

(10) Patent No.: US 7,747,939 B2
(45) Date of Patent: Jun. 29, 2010

(54) GENERATING FREE FORM REPORTS WITHIN A DATA ARRAY

(75) Inventors: Lakshmi Narayanan Thanu, Sammamish, WA (US); Peter Eberhardy, Seattle, WA (US); Hai Huang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 895 days.

(21) Appl. No.: 11/142,062

(22) Filed: May 31, 2005

(65) Prior Publication Data
US 2006/0271841 A1 Nov. 30, 2006

(51) Int. Cl.
*G06F 17/00* (2006.01)
(52) U.S. Cl. .................... 715/212; 715/214; 707/1; 707/3
(58) Field of Classification Search .......... 715/212–220
See application file for complete search history.

(56) References Cited

U.S. PATENT DOCUMENTS

| | | | |
|---|---|---|---|
| 6,317,750 B1 * | 11/2001 | Tortolani et al. ................ 1/1 |
| 6,628,312 B1 * | 9/2003 | Rao et al. .................. 715/853 |
| 6,631,497 B1 * | 10/2003 | Jamshidi et al. ............. 715/205 |
| 7,082,569 B2 * | 7/2006 | Voshell ....................... 715/212 |
| 7,089,266 B2 * | 8/2006 | Stolte et al. ............. 707/104.1 |
| 7,213,199 B2 * | 5/2007 | Humenansky .............. 715/209 |
| 7,251,776 B2 * | 7/2007 | Handsaker et al. .......... 715/212 |
| 7,269,786 B1 * | 9/2007 | Malloy et al. ............... 715/212 |
| 7,415,481 B2 * | 8/2008 | Becker et al. ...................... 1/1 |
| 7,415,664 B2 * | 8/2008 | Aureglia et al. ............. 715/212 |
| 7,530,012 B2 * | 5/2009 | Medicke et al. ............. 715/212 |
| 2001/0054034 A1 * | 12/2001 | Arning et al. ................. 707/1 |
| 2002/0169799 A1 * | 11/2002 | Voshell ....................... 707/503 |
| 2003/0009649 A1 * | 1/2003 | Martin et al. .................. 712/1 |
| 2004/0237029 A1 * | 11/2004 | Medicke et al. ............. 715/503 |
| 2005/0091206 A1 * | 4/2005 | Koukerdjinian et al. ........ 707/3 |
| 2005/0149459 A1 * | 7/2005 | Kofman et al. ................ 706/2 |
| 2005/0210389 A1 * | 9/2005 | Middelfart .................. 715/730 |
| 2008/0046803 A1 * | 2/2008 | Beauchamp et al. ........ 715/212 |

FOREIGN PATENT DOCUMENTS

WO    WO 02/097659 A2 *  12/2002

* cited by examiner

*Primary Examiner*—Doug Hutton
*Assistant Examiner*—Benjamin J Smith

(57) ABSTRACT

Free form reports may be generated within a data array system such as a spreadsheet computer application. A user may select dimension members of a data source, such as an online analytical processing (OLAP) data cube. The user may position the dimension members as headers on the data array where multiple dimensions may be represented in one or both axes. Member formulas are generated that are representative of the headers and include identifiers that point to the dimension member location of the data source. Value formulas are generated within the report grid defined by the location of the headers where the value formulas are representative of the actual data values of the report and include identifiers that point to the data value locations of the dimension member locations within the data source.

11 Claims, 13 Drawing Sheets

|   | A | B | C | D |
|---|---|---|---|---|
| 1 |   |   | Budget | Actual |
| 2 | 2005 | USA | 100 |   |
| 3 |   | Canada |   |   |
| 4 | 2006 | USA |   |   |
| 5 |   | Canada |   |   |

FIG. 11

|   | A | B | C | D |
|---|---|---|---|---|
| 1 |   |   | Budget | Actual |
| 2 | 2005 | USA | 100 | 90 |
| 3 |   | Canada | 100 | 105 |
| 4 | 2006 | USA | 110 | 105 |
| 5 |   | Canada | 110 | 90 |

FIG. 12

|   | A | B | C | D |
|---|---|---|---|---|
| 1 |   |   | Budget | Actual |
| 2 | 2005 | USA | 100 | 90 |
| 3 |   | Canada | 100 | 105 |
| 4 | 2006 | USA | 110 | 105 |
| 5 | 2007 | Mexico | 110 | 90 |

|   | A | B | C | D |
|---|---|---|---|---|
| 1 |   |   | Budget | Actual |
| 2 | 2005 | USA | 100 | 90 |
| 3 |   | Canada | 100 | 105 |
| 4 | 2006 | USA | 110 | 105 |
| 5 |   | Canada | 110 | 90 |
| 6 |   | Washington | 10 | 10 |

FIG. 15

|   | A | B | C | D |
|---|---|---|---|---|
| 1 |   |   | Budget | Actual |
| 2 | 2005 | USA | 100 | 90 |
| 3 |   | Canada | 100 | 105 |
| 4 | 2006 | USA | 110 | 105 |
| 5 |   | Canada | 110 | 90 |
| 6 |   | Washington | 10 | 10 |

FIG. 16

|   | A | B | C | D |
|---|---|---|---|---|
| 1 |   |   | Budget | Actual |
| 2 | 2005 | USA | 100 | 90 |
| 3 |   | Canada | 0 | 0 |
| 4 | 2006 | USA | 110 | 105 |
| 5 |   | Canada | 0 | 0 |
| 6 |   |   |   |   |
| 7 | Currency: | USD |   |   |

GENERATING FREE FORM REPORTS WITHIN A DATA ARRAY

TECHNICAL FIELD

The present disclosure is related to the generation of reports within a data array on a computer.

BACKGROUND

Multi-dimensional information is used in many different applications and scenarios. For example, organizations often track information of various dimensions for purposes of generating reports that allow the organization to visualize the status, performance, etc. of the organization. For example, the organization may track sales over a period of time, at specific locations, for specific products, actual sales, predicted sales, profits from sales, etc. The organization may wish to generate reports that condense large amounts of data of these various dimensions into a concise report.

When generating such reports, it is often necessary to consider multiple dimensions at once. For example, examining the total sales of an organization for a single period of time may not be as useful as examining the sales per year, per location, and per product sold. Therefore, it is beneficial to include multiple dimensions along one or both axes of the report, such as time and location on one axis while sales and budget are on another axis. Furthermore, it may be beneficial to run several reports with different configurations of dimensions on the axes in order to obtain a report that is most informative on an issue that the organization is interested in analyzing.

SUMMARY

One manner of generating a report is to manually enter all of the data into a data array such as by entering actual numerical values into cells of the array. This approach is overly burdensome, costly, and time consuming and is prone to errors. Furthermore, if the report needs to be altered, the values must manually be changed. For example, the number of dimensions of a given axis may need to be increased or decreased from one iteration of a report to the next. Such a change may require every data value to be changed. Therefore, the burden associated with making such a change is just as great as that required to create the initial report.

Free form reports may be generated on a computer, where multiple dimensions may be placed by the user to generate the report. Headers and data values are represented by formulas that contain identifiers that reference the data from a data source which is accessed through a connection. Accordingly, data is obtained and included within the report based on application of the formulas rather than relying on manual entry of the values. In this manner, the report may be updated by updating the formulas which update the values of the report.

DESCRIPTION OF THE DRAWINGS

FIG. 11 shows an example of an abbreviated screenshot after an iteration of the logical operations of FIG. 4, including the logical sub-operations of FIGS. 9 and 10, to add one value formula and data value to a report grid within a data array.

FIG. 12 shows an example of an abbreviated screenshot after a subsequent iteration of the logical operations of FIG. 4, including the logical sub-operations of FIGS. 9 and 10, to add the remaining value formulas and data values to the report grid within the data array.

FIG. 13 shows an example of an abbreviated screenshot where the user has added new dimension members of two existing dimensions but has not cross-joined the dimensions within pre-defined constraints on the axis when placing the headers.

FIGS. 14 and 15 show examples of abbreviated screenshots where the user has added a new dimension member of a same dimension but from a different connection to a data source when placing a header such that the new dimension member is excluded from the initial report grid of the data array but is included in a separate report grid.

FIG. 16 shows an abbreviated screenshot where the user has added a page filter for the free form report.

FIG. 17 shows an example of an abbreviated screenshot for an alternative way to build the free form report of FIGS. 11 and 12 where the dimension of time has not yet been added.

FIG. 18 shows an example of an abbreviated screenshot for the intermediate step of adding the dimension header for time prior to updating the report grid of the data array with new value formulas that include the new dimension of time.

DETAILED DESCRIPTION

Free form reports may be generated within a data array of a computer application program where the data for the report comes from one or more data sources available to the computer application program. Free form reports allow users to choose and place multiple dimensions of data on a single axis of the report as opposed to implementing a pre-determined and fixed structure. The user is given flexibility in how the report organizes and presents the information so that the user may find a format that best suits the needs of the user rather than requiring the report to take on a previously designed structure that may not convey information as effectively and that may not be modifiable.

Data arrays for such free form reports may be provided by various types of computer application programs and the data for the reports may be stored in various formats. For purposes of illustration herein, the computer application is referred to as a spreadsheet having rows and columns with data cells being located at the intersections of row and column indices. Specifically, for purposes of illustration, screen captures are provided for free form reports from EXCEL® 2003 spreadsheet software, available from Microsoft Corp., Redmond, Wash., based on online analytical processing (OLAP) cubes. However, it will be appreciated that the embodiments are not limited to EXCEL® 2003 spreadsheet program or spreadsheet programs in general, but that other spreadsheet programs and other data array capable application programs are also applicable. Furthermore, it will be appreciated that the embodiments are not limited to use of OLAP cubes of data but may employ data sources of formats other than OLAP.

Figure 1:
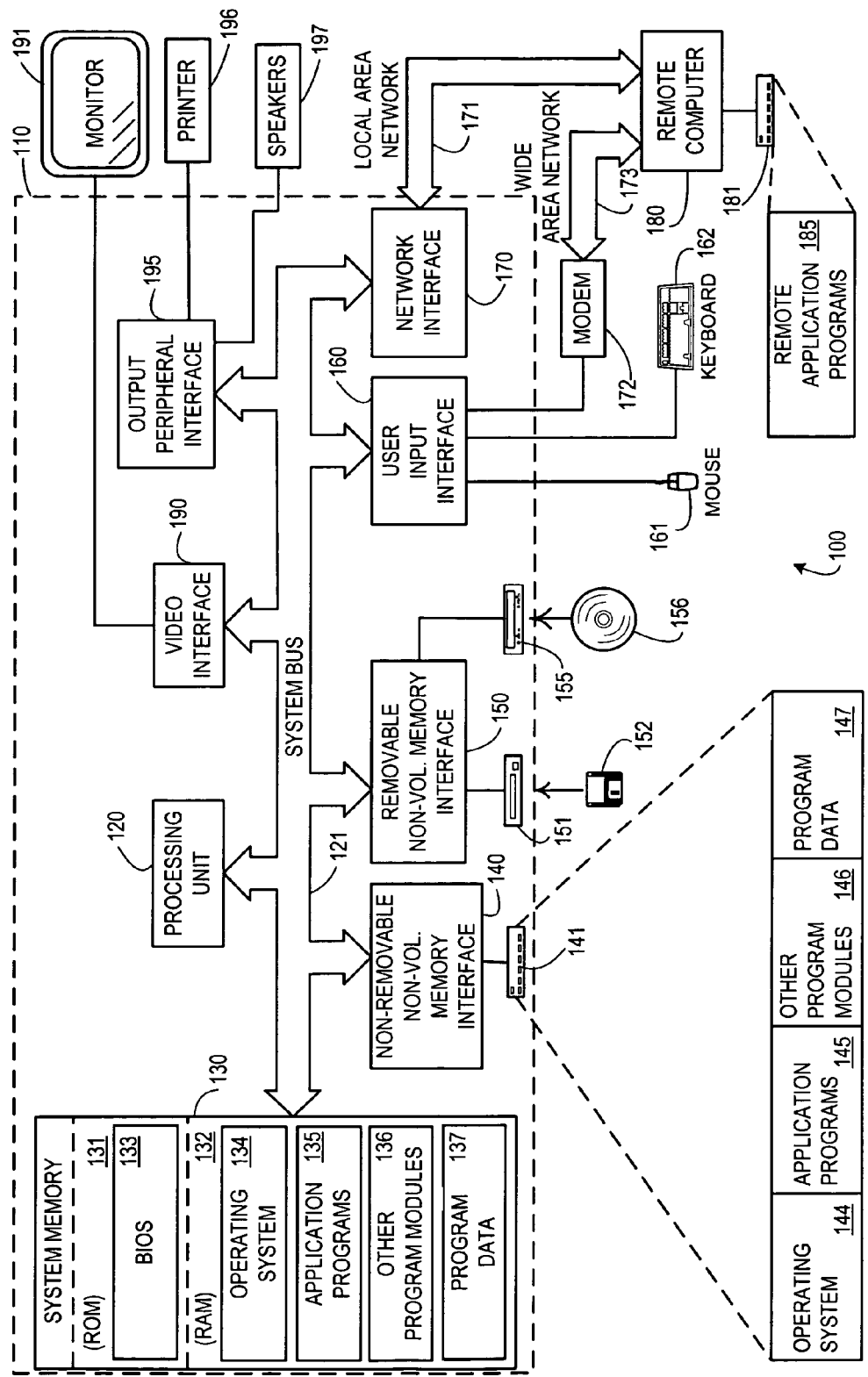
FIG. 1 shows an illustrative computing system that serves as one example of an operating environment for embodiments.

FIG. 1 illustrates an example of a suitable computing system environment 100 on which embodiments may be implemented. The computing system environment 100 is only one example of a suitable computing environment and is not intended to suggest any limitation as to the scope of use or functionality of embodiments. Neither should the computing environment 100 be interpreted as having any dependency or requirement relating to any one or combination of components illustrated in the exemplary operating environment 100.

The embodiments are operational with numerous other general purpose or special purpose computing system environments or configurations. Examples of well known computing systems, environments, and/or configurations that may be suitable for use with the embodiments include, but are not limited to, personal computers, server computers, handheld devices, laptop devices, multiprocessor systems, microprocessor-based systems, set top boxes, programmable consumer electronics, network PCs, minicomputers, mainframe computers, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Embodiments may also be practiced in a distributed computing environment where tasks are performed by remote processing devices that are linked through a communications network. In a distributed computing environment, program modules may be located in both local and remote computer storage media including memory storage devices.

With reference to FIG. 1, an exemplary system for implementing the embodiments includes a general purpose computing device-in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. Further discussion of a data array application program 135 implementing embodiments is discussed in more detail below with reference to FIGS. 2-18.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
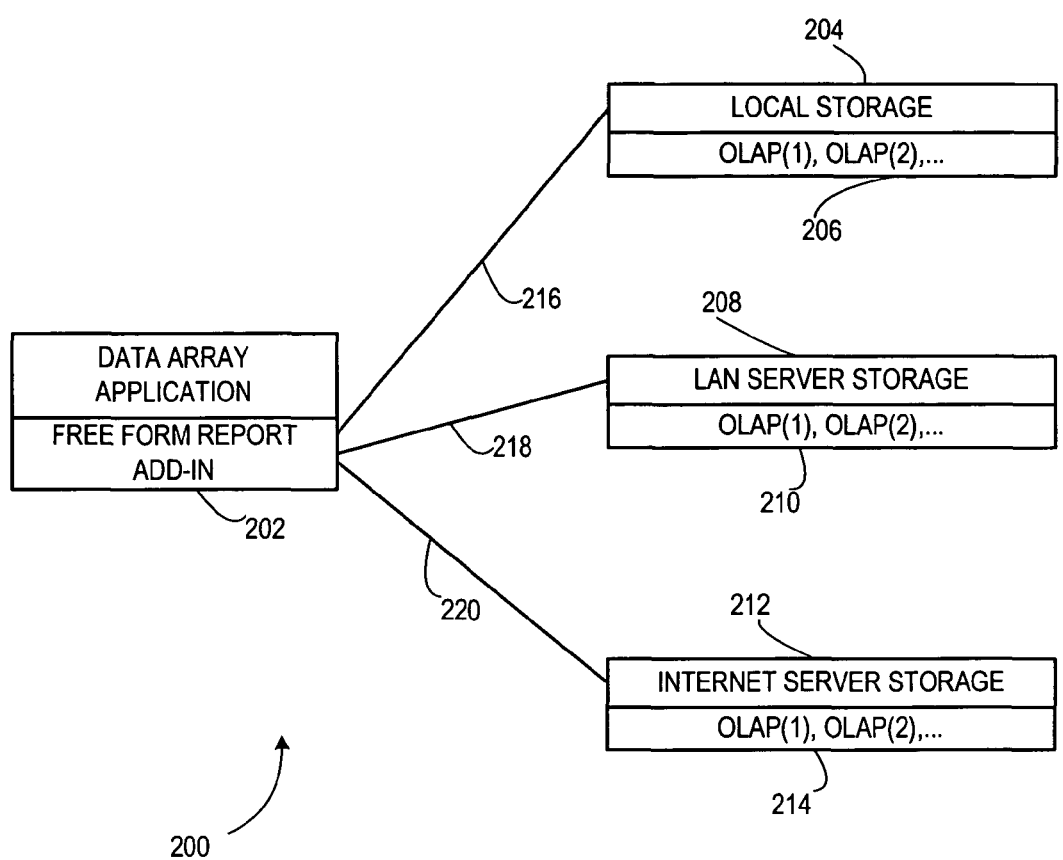
FIG. 2 shows an example of a data array application program executable by the computing system of FIG. 1.

FIG. 2 shows one example of an application program being executed by the computing system of FIG. 1. The data array application program 200 provides a display of a data array of N geometric dimensions, such as a spreadsheet. The first two geometric dimensions of the data array are referred to herein as rows and columns, but the data array may include additional dimensions beyond the row and column. For purposes of clarity, only examples of two geometric dimensions are shown herein. In the embodiment shown, the data array application program 200 includes a free form report add-in module 202 that provides the user with the ability to generate free form reports for data from external data sources in a report grid formed within the data array. One example of such a data array application is the EXCEL® 2003 spreadsheet program, available from Microsoft, Corp. of Redmond, Wash. A complementary example of the add-in module 202 is the EXCEL® Add-In for SQL Server Analysis Services TM module for the EXCEL® spreadsheet program, and is available from Microsoft Corp., Redmond, Wash. The EXCEL® Add-in for SQL Server Analysis Services™ makes a Cube Analysis menu available on the EXCEL® spreadsheet program menu bar. While the embodiment is shown as having the add-in module 202, it will be appreciated that the functionality for building the free form reports according to embodiments may alternatively be a native function of the data array application itself, rather than employing an add-in module 202.

FIG. 2 also illustrates a set of physical connections 216, 218, and 220 that link the add-in module 202 to various logical connections that are distinct data sources such as separate databases typically known as cubes due to the multiple dimensions of data that are contained therein. Although three physical connection 216, 218, 220 are illustrated, the number of physical connections and the number of associated data sources may vary depending on the number and location of the data sources for the report. The data sources may be located in one or more data stores. The data store(s) providing the one or more data sources for the report may, for example, be separate OLAP databases accessible via an OLAP server, where each physical connection may have its own OLAP server(s) and/or OLAP databases. Examples of data stores accessed through the physical connection may include local storage 204 (i.e., a data store), discussed above in relation to FIG. 1, having one or more cubes 206 (i.e., one or more data sources); LAN server storage 208 (i.e., a data store) having one or more cubes 210 (i.e., one or more data sources); and WAN or Internet accessible server storage 212 (i.e., a data store) having one or more cubes 214 (i.e., one or more data sources).

Figure 3:
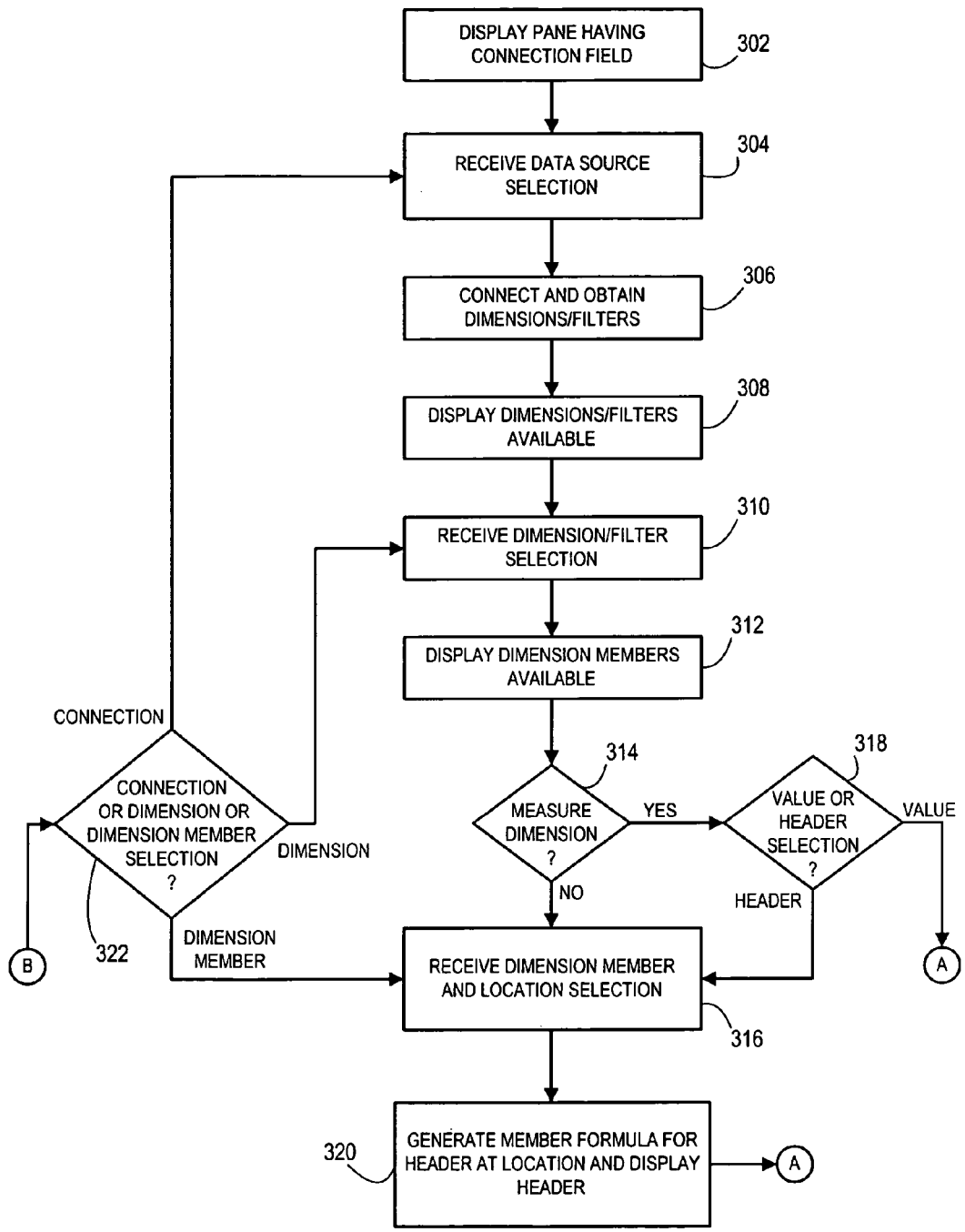
FIG. 3 shows an example of logical operations performed by the free form report add-in of FIG. 2 to obtain user input to configure the free form report and generate member formulas for the headers of the free form report.
Figure 4:
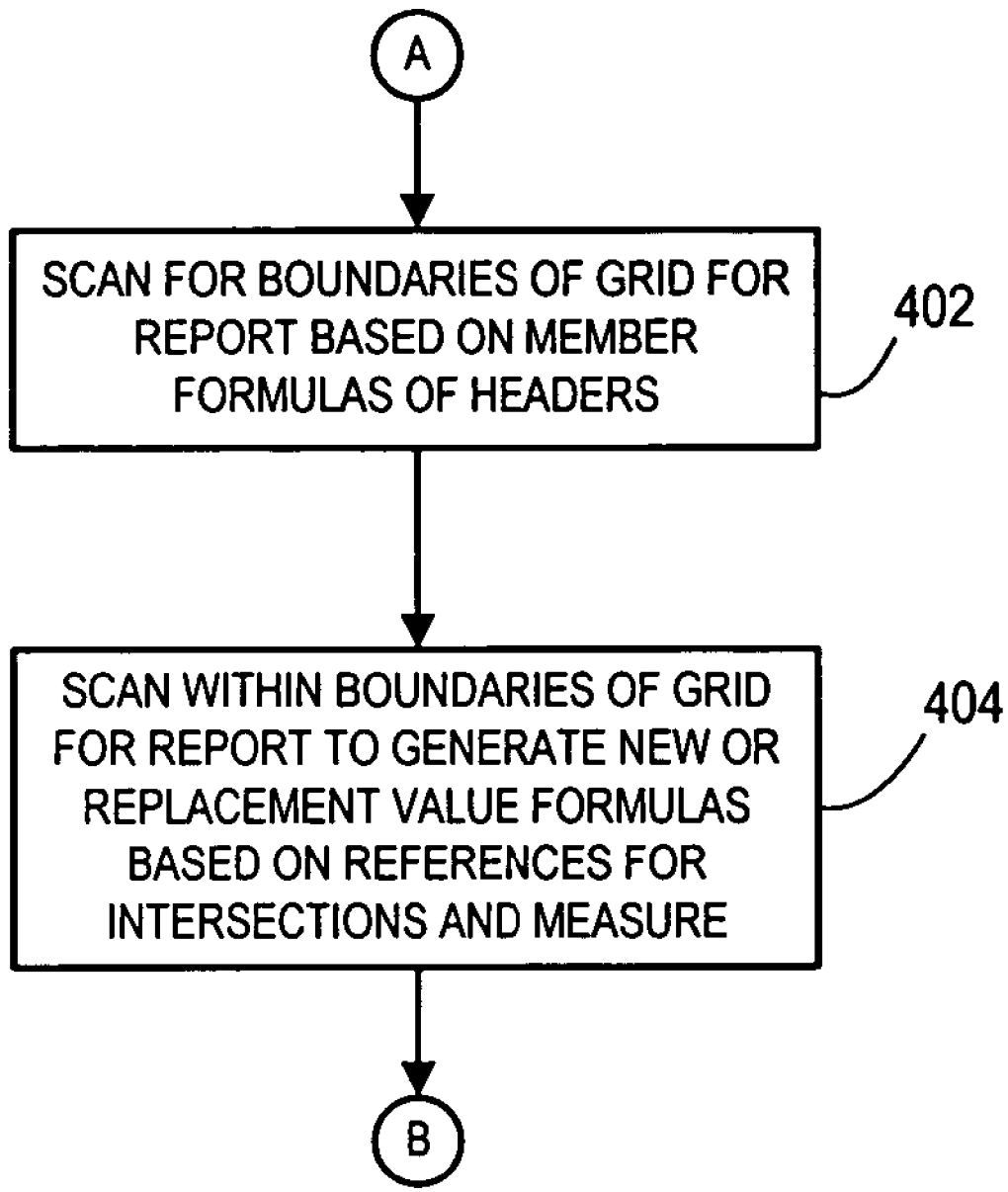
FIG. 4 shows an example of logical operations performed by the free form report add-in of FIG. 2 to determine the boundaries of the free form report as established by the headers positioned by the user and to generate new or replacement value formulas for the cells within the boundaries of the report within the data array.
Figure 5:
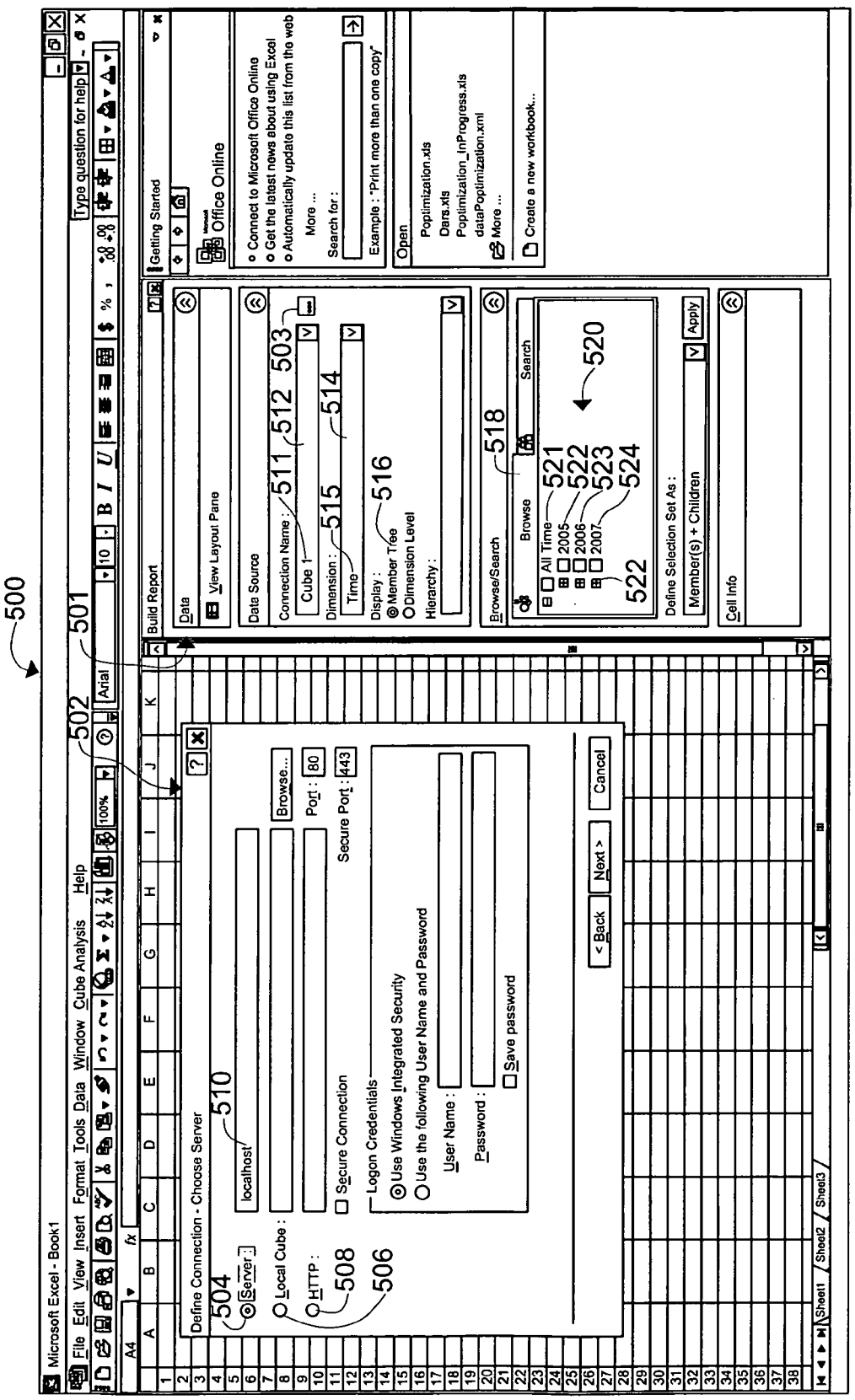
FIG. 5 is a screenshot in one illustrative embodiment showing a pane for defining a data source, for selecting a specific data source, and for selecting a particular dimension and member of the dimension for the specific data source.

FIGS. 3 and 4 provide an example of logical operations that allow for the free form reports to be built. These logical operations will be discussed in relation to the example screenshots of FIGS. 5-8. The logical operations begin at display operation 302 where, as shown in screenshot 500 of FIG. 5, a task pane 501 is displayed that provides the user with options for selecting a data source (e.g., cube). To allow the user to define the location of the data source in a data store, a browse control 503 may be provided that when selected causes a dialog box 502 to appear. As shown in FIG. 5, the dialog box 502 provides three data store options, a server option 504 such as for a LAN, a local cube option 506 such as for local storage, and an http option 508, such as for an Internet accessible storage location. It is to be appreciated that any number and/or type of data store options may be presented to the user. For each option, an address field 510 may be provided to allow the user to enter the specific name or address of the data source location (e.g., data store). FIG. 3 assumes the user has entered a valid data source location.

Upon establishing a data source location for one or more data sources, such as an OLAP server having one or more OLAP databases, a data source name drop down control 512 allows the user to select from the available set of data sources (e.g., databases) for the selected data store. In this instance, the user has selected the Cube 1 data source, at selection operation 304 shown in FIG. 3. Upon selecting the particular data source name, the connection to that data source is established and available dimensions and filters are obtained from the data source at connection operation 306 as shown in FIG. 3. The available dimensions of the selected data source may be displayed at display operation 308 to allow the user to select from the available dimensions within the selected data source. The user interface may display the available dimensions in any suitable manner, such as with a dimension drop down control 514 as shown in FIG. 5. The user may then select an available dimension which is received by the data array application program at selection operation 310. In the example of FIG. 5, the user has selected the dimension "Time" 515.

The user may select display options indicating how the dimension is displayed. Any suitable display options and/or display formats may be indicated, such as tree formats, where each dimension member is individually selectable, a dimension level view where all dimension members are selectable as a group, and the like. The display option may be selected in any suitable manner, such as through a display option selector 516 as shown in FIG. 5. For purposes of illustration, the method of FIG. 3 assumes and FIG. 5 shows that the user has selected member tree as the display option. The task pane 501 then displays the dimension members for a browse tab 518 within the dimension tree 520 at display operation 312. The dimension tree may include one or more selectable dimension members 522 which may be selectable individually, as a set, and the like. In this instance of FIG. 5, the dimension members of the dimension "Time" 521 include the years "2005" 522, "2006" 523, and "2007" 524.

Query operation 314 detects whether the user has selected a dimension "Measure." When selecting information for a report, users can utilize a member in the dimension "Measure" to display values for only a single measure, or they can place the dimension "Measure" on an axis so that they can see values for all the cube's measures. In the OLAP context, the dimension "Measure" is different from other dimensions insofar as it is created automatically when a cube is created; cannot be displayed or edited in Dimension Editor OLAP tool; and is always flat (that is, always contains only one level). For example, the dimension "Measure" may include members such as gross sales, net sales, unit sales, cost, profit, etc. that is relevant to all or a portion of the other dimensions that may be selected for the report. Furthermore, the dimension "Measure" may be numerical, including but not limited to integers, decimal real numbers, etc., but may also be of other forms including alphabetical and alphanumerical. For purposes of example, the screenshots herein show a numerical dimension "Measure."

If the dimension is a dimension "Measure," then query operation 318 detects whether the user has selected a dimension member as a header or has selected to add the dimension member to the report as a default or assumed value such that no header is necessary. If the dimension member of "Measure" is selected as a value rather than a header, then operational flow proceeds to FIG. 4 which is discussed below. If the dimension member of "Measure" is selected as a header or if the dimension that has been selected is other than the dimension member, then operational flow proceeds to selection operation 316.

At selection operation 316, the user selects the desired member such as "2005" 522 shown in FIG. 5, and positions it within the data array such as by a drag and drop or entering a grid position by row and column indices, and any other suitable position indication. Upon selecting and placing the dimension member to generate a header for the report, a member formula is then generated 320 based on the chosen dimension member and its placement on the data array. The member formula is representative of a header name for the cell, or intersection of row and column, on the data array where the dimension member was positioned. Logical operations then proceed to FIG. 4.

The logical operations are discussed below, but once the logical operations of FIG. 4 are complete, then operational flow returns to query operation 322 where it is determined whether the user has selected a new data source name, a new dimension, or a new dimension member. If the user has selected a new data source, then operational flow returns to selection operation 304 where the new data source is received. If the user has selected a new dimension, then operational flow returns to selection operation 310 where the new dimension is received. If the user has selected a new dimension member, then operational flow returns to selection operation 316 where the new dimension member and its location as positioned on the data array are received.

Figure 6:
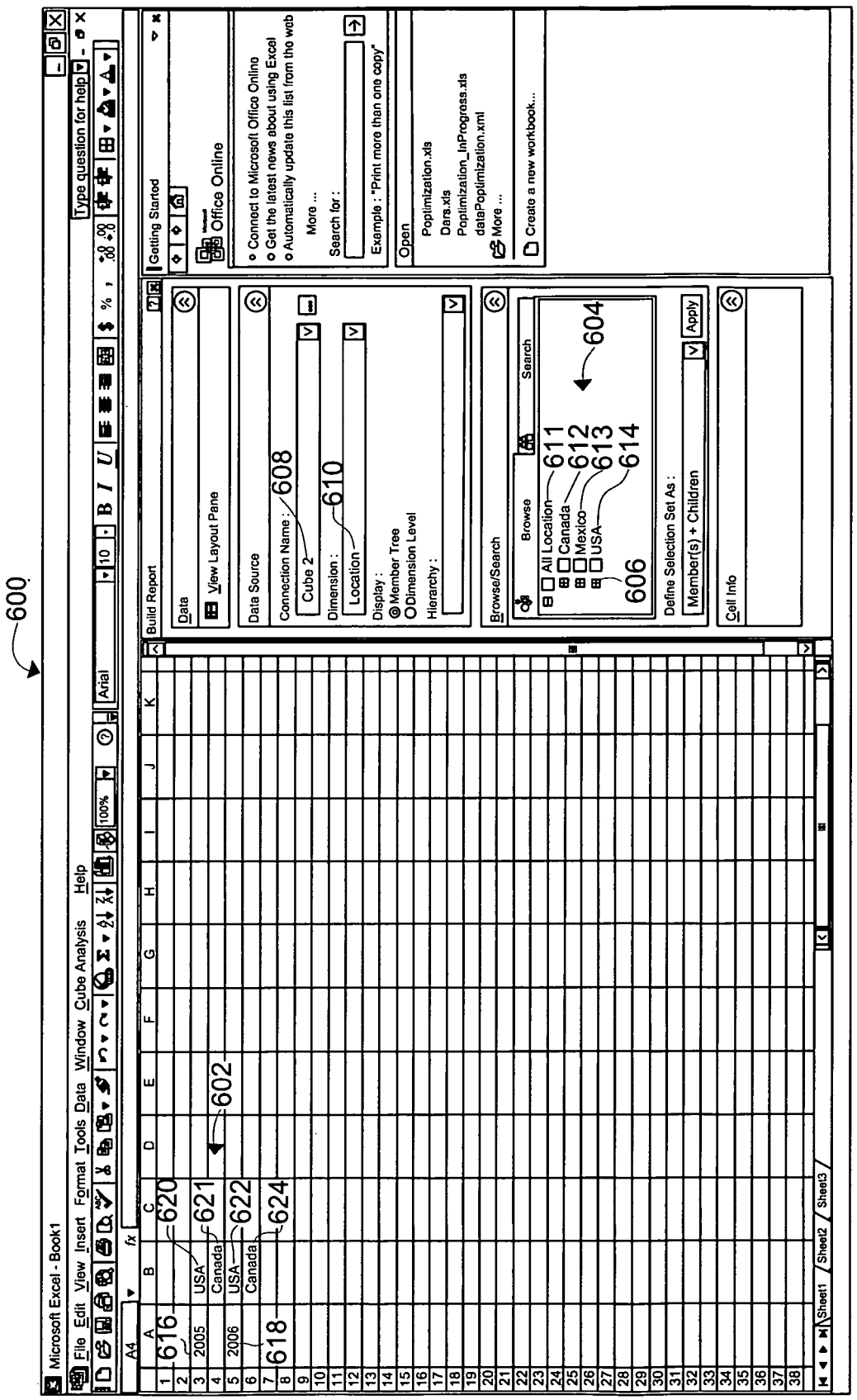
FIG. 6 is another screenshot in one illustrative embodiment showing a pane for defining a data source, for selecting another specific data source, and for selecting another particular dimension and member of the dimension for the specific data source and also showing header placement of multiple dimensions and dimension members on an axis.
Figure 7:
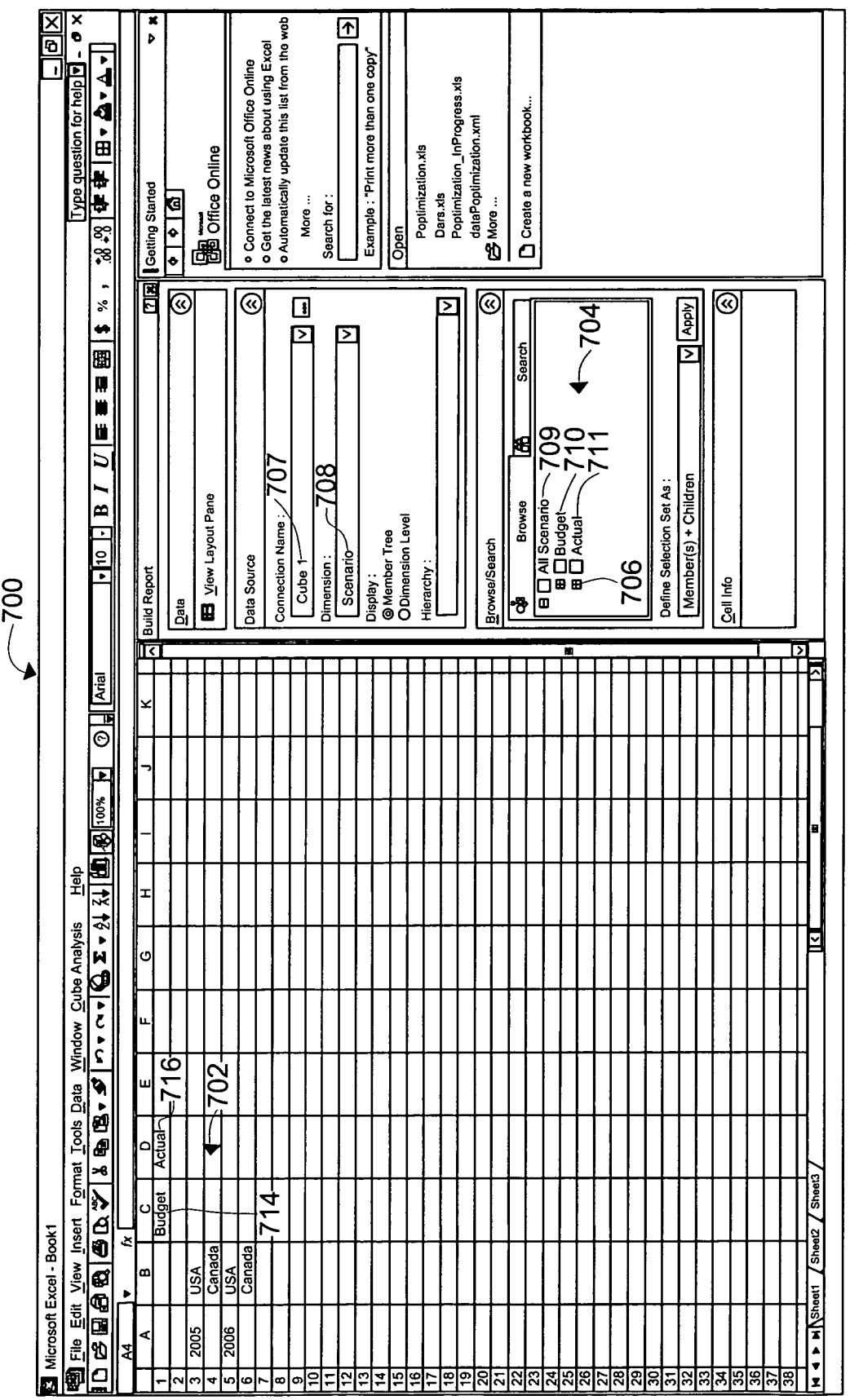
FIG. 7 is another screenshot in one illustrative embodiment showing a pane for defining a data source, for selecting the specific data source, and for selecting another particular dimension and member of the dimension for the specific data source and also showing additional header placement on a new axis.
Figure 8:
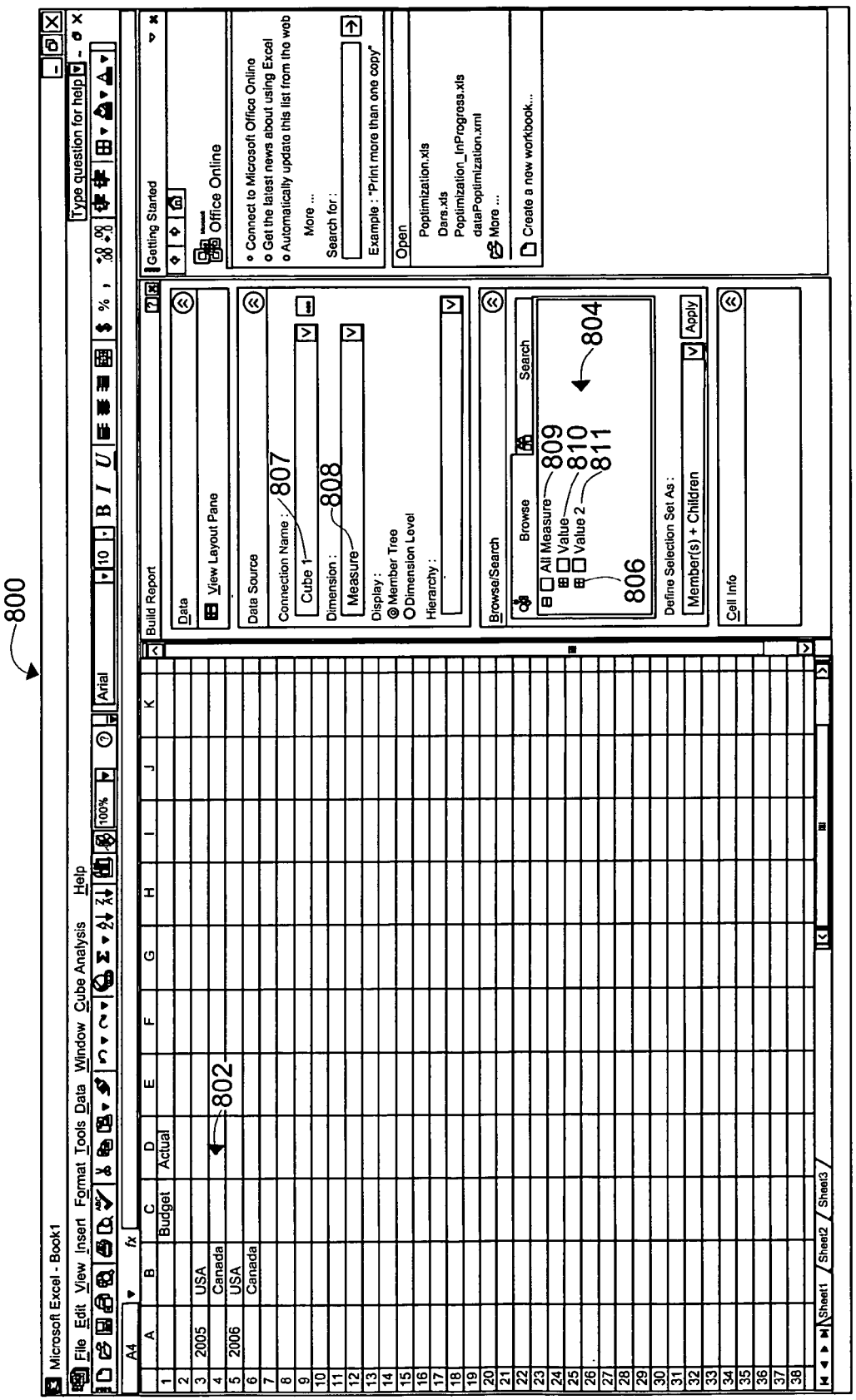
FIG. 8 is another screenshot in one illustrative embodiment showing a pane for defining a data source, for selecting the specific data source, and for selecting a measure dimension and member of the measure dimension for the specific data source.

When the user is initially selecting dimension members to establish headers and corresponding dimensions on the horizontal or vertical axes of the data array, the logical operations of FIG. 4 can detect the boundaries of the report grid established by the dimensions on the axes. However, if no "Measure" dimension has been added, then no value formulas, and hence no values, are provided on the report grid of the data array prior to operational flow returning to query operation 322. FIGS. 6-8 illustrate an example series of user interface screen shots showing the user having selected a series of dimension members from varying dimensions and having positioned the dimension members on the report grid within the data array. In particular, FIG. 6 shows a screenshot 600 where the user, after having selected the dimension member "2005" and then the dimension member "2006" for the dimension "Time," has then selected a new data source name "Cube 2" 608, has selected the dimension "Location" 610 of "Cube 2" 608 that resulted in member tree 604 with individual members 606, and has then selected the dimension member "USA" 614 under dimension "Location" 611 followed by the dimension member "Canada" 612. In this example, dimension "Location" 611 also includes "Mexico" 613 which has not been selected by the user.

The result of the user selection and positioning for these dimension members may be reflected in a grid space 602. The user has established a vertical axis having two dimensions, time and location, each with two dimension members. The outer dimension is "Time" and the inner dimension is "Location." Outer and inner dimensions may be indicated in any suitable manner. For example, an outer/inner indicator may be used, placement in the list may indicate primacy of the dimension, and the like. In the example of FIG. 6, the first listed dimension indicates the outer dimension and the second listed dimensions indicates the inner dimension. By placing the outer dimension first, once the inner dimension is placed, the logical operations may automatically create enough blank spaces between the dimension members of the outer dimension to accommodate the inner dimension members, and then duplicate the inner dimension members for each outer dimension member to eliminate the need for the user to do so. As an alternative, the logical operations may instead rely upon the user to provide the proper placement of the outer dimension members and the duplication of inner dimension members for each outer dimension member. A double-check of the format of the headers may be performed when determining the boundaries of the report, which is discussed in more detail in relation to FIG. 9 below.

At this point, a member formula has been generated for each instance that a dimension member has been positioned on the report grid 602 within the data array to result in the headers being displayed. So, rather than having cell A2, for example, actually having the header string (e.g., "2005") entered, a member formula is instead entered which is representative of the dimension member and causes the header label (e.g., numeral "2005" 616) to appear. A member formula is present for each header as shown in FIG. 6, to thereby produce the header labels "2005" 616, "2006" 618, "USA" 620 for "2005" 616, "Canada" 621 for "2005" 616, "USA" 622 for "2006" 618, and "Canada" 624 for "2006" 618. An example of a set of member formulas describing the report grid within the data array at this point in the operation are shown in Table 1.

TABLE 1

Member Formulas Present for FIG. 6

2005 = CUBECELLMEMBER("Cube1", "Time", "Time.2005")
2006 = CUBECELLMEMBER("Cube1", "Time", "Time.2006")
2007 = CUBECELLMEMBER("Cube1", "Time", "Time.2007")
USA = CUBECELLMEMBER("Cube2", "Location", "Location.USA")
Canada = CUBECELLMEMBER("Cube2", "Location", "Location.Canada")

As can be seen from Table 1, the formulas provide a reference or identifier of the data source name such as "Cube 1" or "Cube 2;" the dimension name such as "Time," "Location," and the like; and an identifier of the dimension member such as "Time.2005." In the context of an OLAP example, the dimension member identifier is known as an OLAP key. It will be appreciated that the formulas may be in any suitable order and/or format. Moreover, it will be appreciated that the member formulas for the inner dimension members are repeated as necessary for the number of outer dimension members to produce repeated inner dimension headers for the outer dimension headers.

FIG. 7 shows an example screenshot 700 where the user, after having re-selected data source name "Cube 1" 707 and then selecting a dimension "Scenario" 708, has then selected and positioned both the dimension member "Budget" 710 under "Scenario" 709 and the dimension member "Actual" 711 under "Scenario" 709 from the individual members 706 of the dimension tree 704. The result of this user activity is reflected in the example report grid 702 where the header "Budget" 714 for the dimension member "Budget" 710 and the header "Actual" 716 for the dimension member "Actual" 711 are positioned on the horizontal axis to thereby add the dimension "Scenario" 709 to that axis. Again, a member formula is present for each header as shown, and an example set of member formulas describing the report grid at this point in time are shown in Table 2.

TABLE 2

Member Formulas Present for FIG. 7

2005 = CUBECELLMEMBER("Cube1", "Time", "Time.2005")
2006 = CUBECELLMEMBER("Cube1", "Time", "Time.2006")
2007 = CUBECELLMEMBER("Cube1", "Time", "Time.2007")
USA = CUBECELLMEMBER("Cube2", "Location", "Location.USA")
Canada = CUBECELLMEMBER("Cube2", "Location", "Location.Canada")
Budget = CUBECELLMEMBER("Cube1", "Scenario", "Scenario.Budget")
Actual = CUBECELLMEMBER("Cube1", "Scenario", "Scenario.Actual")

FIG. 8 shows an example of a screenshot 800 where the user has selected the dimension "Measure" 808 of data source "Cube 1" 807. A member tree 804 shows individual members 806 of the selected dimension "Measure" 809 including a dimension member "Value" 810 and a dimension member "Value 2" 811. In this screenshot 800, the user has not made a selection of a dimension member. Accordingly, report grid 802 has not changed from that shown in FIG. 7. However, as discussed below in relation to FIG. 11, the user may select to place a data value of the dimension member "Value" 810 onto the report grid, as opposed to adding the dimension member "Value" as a separate header.

FIG. 4 shows an example of additional logical operations that may be employed to find the boundaries of the report grid within the data array and then populate the cells of the report grid that are not headers with actual data values. At scan operation 402, the data array is scanned intersection-by-intersection (i.e., cell-by-cell) for boundaries by finding member formulas previously generated as discussed above. The details of scan operation 402 are discussed in more detail with reference to FIG. 9. However, once scan operation 402 is complete, the scan operation 404 again scans the report grid intersection-by-intersection within the boundaries found in scan operation 402 to then find any pre-existing formulas, such as may exist if the current report generation is not an initial iteration for a report. The scan operation 404 may generate new and/or replacement value formulas where necessary, such as where the report has been altered by collapsing certain dimensions by removing certain dimension members, removing dimensions altogether, expanding certain dimensions by adding certain dimension members, etc.

Figure 9:
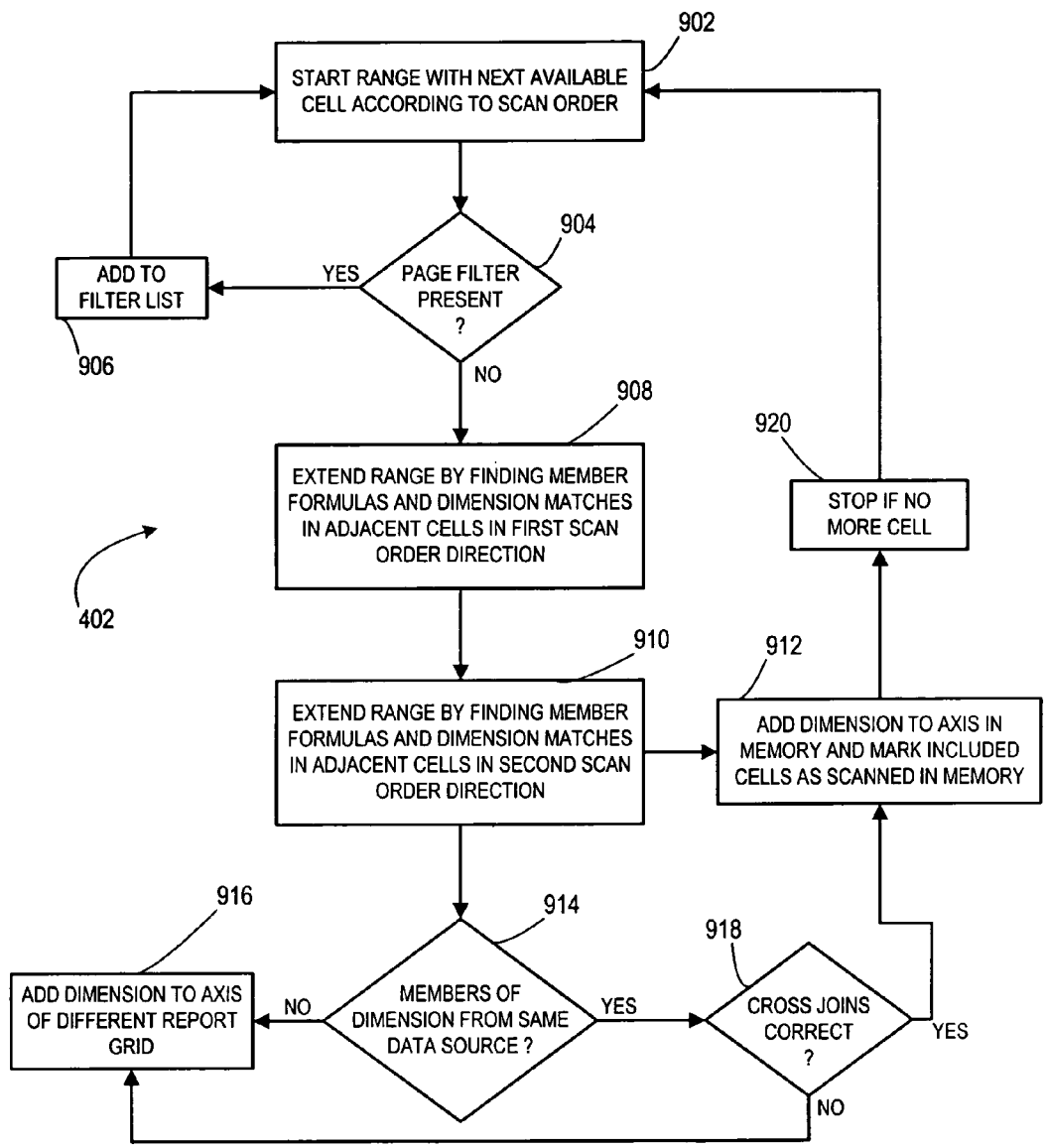
FIG. 9 shows an example of the logical sub-operations of the initial operation of FIG. 4.

FIG. 9 shows an example of the logical operations that provide for scanning operation 402 in one example. The logical operations begin at range operation 902 where the scanning begins at a next available cell per the scan order. The scan order may be left to right and then top to bottom, but may be of other orders as well. The initial cell for a scan order may be any suitable cell, such as the top-left-most cell for a left to right, top to bottom scan order. The next available cell may be determined in any appropriate manner, such as by determining the next cell in the scan order that is not marked in memory as having been previously scanned.

Query operation 904 detects whether the user has positioned a page filter on the report grid. If so, then the page filter that is found is added to a filter list in memory at filter operation 906. The page filter may be selected and positioned just as a dimension member, and the page filter placed on the report grid has a representative member formula. In this example, the page filter is distinguished from a normal dimension member by determining whether the cell containing the member formula also includes a drop down control, as the particular filter to apply to the report can be selected on the report itself by the drop down control.

If query operation 904 does not detect a page filter at the current cell, then extension operation 908 extends the range for a cell otherwise containing a member formula by attempting to find member formulas in adjacent cells in a first scan order direction that have a matching dimension to the member formula representative of the current position such that they belong to the same dimension. As discussed above, the first scan order may be left to right, top to bottom, and the like. Furthermore, the first scan order may be the reverse of any of those options. Blanks may be allowed between such adjacent positions to account for cross-joins, discussed below. The range is extended by marking in memory those adjacent cells with member formulas having matching dimensions.

Upon completing the first scan order direction, then the range is attempted to be extended along the opposite axis by finding member formulas having a dimension matching that of the current position in a second scan order, such as top to bottom where the first scan order was left to right, at extension operation 910. Again, blanks may be allowed to account for cross-joins. The range is extended by marking in memory those adjacent cells with member formulas having matching dimensions that indicate that these adjacent cells belong to the same dimension. By extending the range in both the first and second scan order and then repeating until all cells having member formulas have been marked as scanned, the dimensions of each axis and positions of the dimension members are stored in memory. The dimension for the current position is added to the particular axis in memory for which those member formulas of matching dimension have also been found to be adjacent at memory operation 912. Through multiple iterations of the logical operations of FIG. 9, the storage in memory of the dimensions for each axis thereby defines the boundaries of the report grid within the data array.

This discussion of FIG. 9 and the discussion below for FIG. 10 has focused on a data array of two geometric dimensions as shown in the examples, where there is a first direction of a scan order and a second direction. However, it will be appreciated that the data array may include additional geometric dimensions such that there are more than two directions per scan order. Therefore, it will be appreciated that the logical operations of FIG. 9 can accommodate additional geometric dimensions of the data array by scanning each of the dimensions in the extension operations 908, 910 in succession according to the particular scan order.

Returning to FIG. 9, prior to storing in memory the dimension for a particular axis, embodiments may also perform checks to ensure that the layout of the headers is appropriate for generating a report with consistent usage of inner and outer dimensions. In such a case, after extending the ranges, query operation 914 detects whether the members of a dimension come from the same data source. If so, then it is expected that the relationship of the chosen dimension members are related as expected. However, if one or more of the dimension members comes from a different data source, it is possible and perhaps even likely in the case of OLAP databases that the dimension members are not related as expected such that the report is invalid if the dimension is included. The dimension may be added to an axis of a different report that will possibly be an orphaned axis at memory operation 916.

If query operation 914 finds that the members of the same dimension do come from the same data source, then query operation 918 detects whether the cross-joins are correct. Cross-joins occur where multiple dimensions are located on a single axis, resulting in outer dimension members and inner dimension members. In such a case, for the report to properly show a value for every inner dimension member per each outer dimension member, then there must be the expected number of blanks between the outer dimension members to allow for the headers of the inner dimension members to be grouped per outer dimension member. The expected number of blanks is a design choice that is dependent upon how many, if any, blank rows and columns may be included within a report. Where the number of blank rows and columns is zero such that the report is geometrically concise, the expected number of blanks between the outer dimension members is equal to the number of inner dimension members minus one. It may also be desirable for the inner dimension members to be repeated for each outer dimension member in the same order. Thus, a check may be made that the expected number for blanks are present and/or that the order of inner members is repeated in the same order.

If it is determined that the cross-joins are not proper, then operational flow may proceed to memory operation 916 to store the dimension for an axis of a different report that will likely be an orphaned axis. If the cross-joins are proper, then operational flow may proceed to memory operation 912. After the dimensions are added to the axes in memory, then operational flow either returns to range operation 902 to scan for the next unscanned cell, or the iterations discontinue at stop operation 920 so that operational flow proceeds to scan operation 404 if there are no remaining unscanned cells having member formulas.

Figure 10:
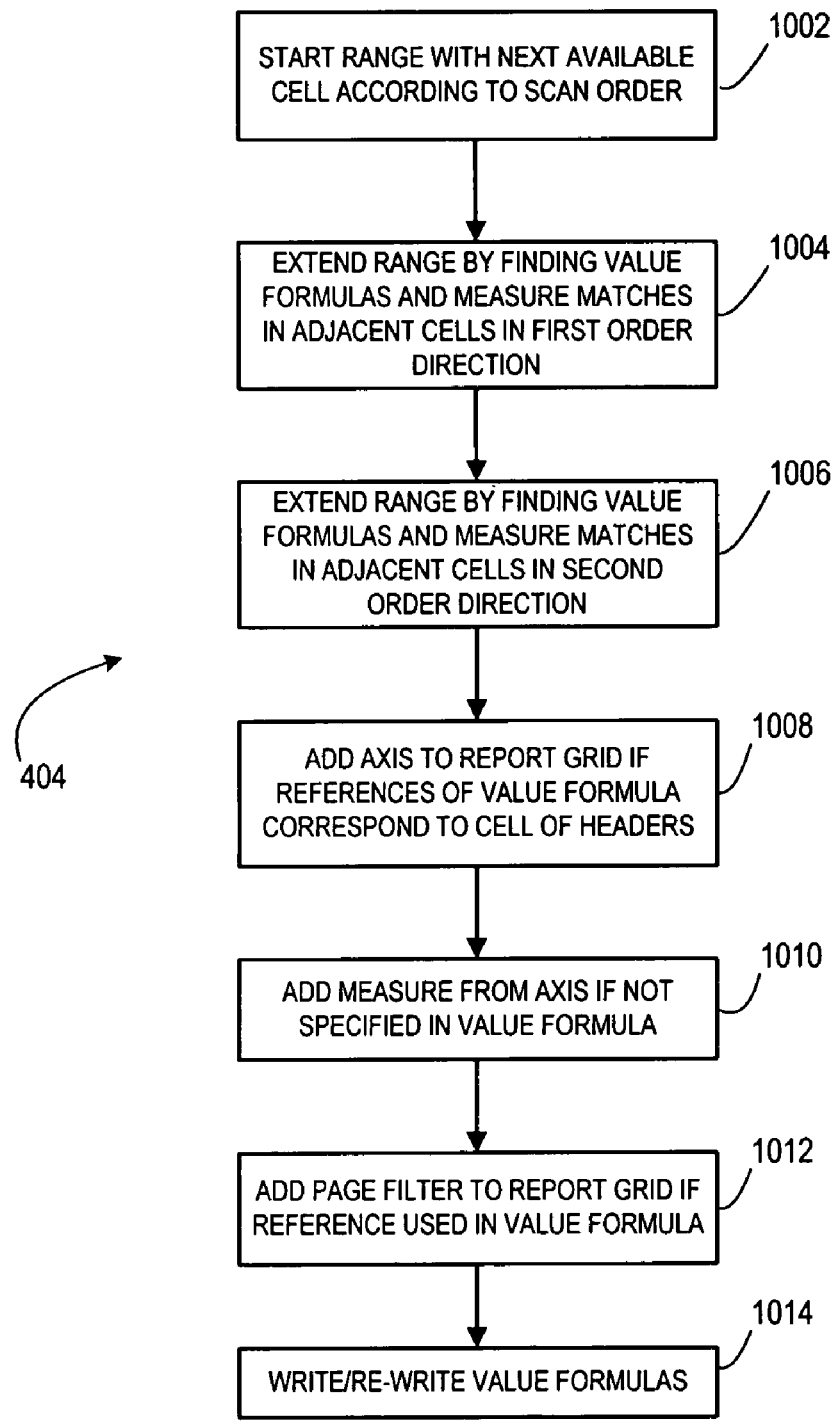
FIG. 10 shows an example of the logical sub-operations of the latter operation of FIG. 4.

FIG. 10 shows an example of the logical operations that provide for scanning operation 404 in one example. The logical operations begin at range operation 1002 where the scanning begins at a next available cell without a member formula per the scan order. As in the operations of FIG. 9, the scan order may be left to right and then top to bottom, but may be of other orders as well, and the initial cell may be any suitable cell such as the top-left-most cell. The next available cell may be determined in any suitable manner, such as by determining the next cell in the scan order that is not marked in memory as having been previously scanned.

Extension operation 1004 extends the range for a cell otherwise containing a value formula, such as from previous iterations, by attempting to find value formulas in adjacent cells in a first scan order direction that have a matching measure to the value formula representative of the data value of the current position. As discussed above, the first scan order may be left to right, top to bottom, and the like. Furthermore, the first scan order may be the reverse of any of those options. Blanks may not be allowed in this case, where it is expected that data values are not separated by blanks within the report grid. The range is extended by marking in memory those adjacent cells with existing value formulas having matching measures.

Upon completing the first scan order direction, then the range is attempted to be extended along the remaining axes in succession by finding value formulas having a measure matching that of the current position in a second scan order, such as top to bottom where the first scan order was left to right, at extension operation 1006. The range is extended by marking in memory those adjacent cells with value formulas having a matching dimension "Measure." By extending the range in both the first and second scan order and then repeating until all cells having member formulas have been marked as scanned, the dimensions of each axis and positions of the dimension members is stored in memory. Again, blanks may not be allowed where it is expected that data values are not separated by blanks within the report grid. The axis for the current position is added to the particular report grid in memory for which those value formulas of matching dimension "Measure" have also been found to be adjacent at memory operation 1008. Through multiple iterations of the logical operations of FIG. 10, the storage in memory of the dimensions for each axis thereby defines the boundaries of the report grid.

Where a value formula is encountered that does not have a specified dimension "Measure," such as where the value formula has not been provided via a member formula as a header, then the dimension "Measure" for the axis is added in memory for the value formula at measure operation 1010. Additionally, if a page filter was previously not added to the filter list because it was not discovered on the report grid but a value formula is discovered that has a page filter identifier, then in some embodiments it may be presumed that the page filter should be used and the page filter is then added to the report grid at filter operation 1012. Finally, new value formulas are then generated within the report grid, if none was in the cell before, or replacement value formulas are generated within the report grid if a value formula was previously in the cell but a change has occurred to the headers, filters, etc. During the iterations of the operations of FIGS. 9 and 10, the report is updated as changes are made by the user. The logical operations detect the changes when scanning the cells in the operations of FIGS. 9 and 10 to thereby update the report after the user had made the changes when creating the new or replacement value formulas. As the value formulas are representative of the value for the cell, the value formulas result in the value being displayed. Examples of value formulas, including the information included therein, are discussed below in relation to FIGS. 11 and 12.

FIG. 11 shows an example result after the iterations of FIG. 9 have completed and an initial iteration of FIG. 10 has completed for the new free form report discussed above in relation to FIGS. 5-8. As was shown in FIG. 8, no data values had yet been displayed within the report grid as no dimension member for the dimension "Measure" had been selected and positioned. Once the user has selected the dimension member "Value" and positioned it in at the intersection point of the dimension members "Time," "Location," and "Scenario", in particular "2005" 1102, "USA" 1104, and "Budget" 1106, the iteration of the operations of FIGS. 9 and 10 result in an initial value formula being generated for intersection point C2 that points to the location within the database where the value for the "Budget" 1106 of the "USA" 1110 for year "2005" 1102 is located and thereby causes the value to be obtained and displayed. The value in this example is "100" 1101. The value formula that is generated is shown below in Table 3.

TABLE 3

Value Formula Present for FIG. 11

C2 = CUBECELLVALUE("Cube1", C1, A2, B2, "Measure.Value")

As can be seen from Table 3, the value formula for cell C2 which has resulted in the value of "100" specifies that the value comes from "Cube 1," and is located on the basis of the references (e.g., C1, A2, and B2) within the formula. These references refer to cell locations, e.g., the intersection of column C with row 1, within the report grid of the data array, and these referenced cell locations contain member formulas that are representative of the header labels displayed at the cell locations. The member formulas at these cell locations include the identifiers of the data source locations where the actual values for the report grid are stored (e.g. "Time.2005"). In the example of Table 3, the value at cell location C2 is based on the identifiers of the member formulas located by the references C1, A2, B2 and is further based on the dimension "Measure" and the dimension member "Value." Accordingly, the database returns the value of "100" once a query of "Time.2005," "Location.USA," "Scenario.Budget," and "Measure.Value" has been submitted.

It will be appreciated that when generating the value formulas, as opposed to including references to the cells upon which the member formulas for the headers are located in order to obtain the identifiers of the member formulas, those member formulas could be included directly in the value formula itself. So, for example, rather than including the reference C1 in the value formula, "Scenario.Budget" could have been included instead. Additionally, it will be noted that the key for the dimension "Measure," "Measure.Value," was included directly, but had this dimension member of "Measure" been a header, then the cell row and column indices for the header could have been included as a reference instead of the key for the "Measure."

Returning to FIG. 11, at this point, the report grid that has been found by detecting the boundary and storing the axes in memory via the initial iteration of the scan is shown as a boxed region 1100. The dimension members "Actual" 1108, "Canada" 1112 for "2005" 1102, "2006" 1104, "USA" 1114 for "2006" 1104, and "Canada" 1116 for "2006" 1104 are not yet included within the report grid as the ranges have not yet been extended to include these.

Upon completing the initial iteration, no change has been made by a user so operations of FIGS. 3 and 9 detect no change and the operations of FIG. 10 are iterated again. During this iteration, these operations find no existing adjacent value formulas to account for but do generate new adjacent value formulas based on the selected dimension "Measure" and the headers. Thus, the values are populated for the entire grid space of the report as shown in the example of FIG. 12 by generating a value formula for each intersection of the entire grid space for the report. The complete set of value formulas that are generated to complete the report of FIG. 12 are shown below in Table 4.

TABLE 4

Value Formulas Present for FIG. 12

C2 = CUBECELLVALUE("Cube1", C1, A2, B2, "Measure.Value")
C3 = CUBECELLVALUE("Cube1", C1, A2, B3, "Measure.Value")
C4 = CUBECELLVALUE("Cube1", C1, A4, B4, "Measure.Value")
C5 = CUBECELLVALUE("Cube1", C1, A4, B5, "Measure.Value")
D2 = CUBECELLVALUE("Cube1", D1, A2, B2, "Measure.Value")
D3 = CUBECELLVALUE("Cube1", D1, A2, B3, "Measure.Value")
D4 = CUBECELLVALUE("Cube1", D1, A4, B4, "Measure.Value")
D5 = CUBECELLVALUE("Cube1", D1, A4, B5, "Measure.Value")

Again, the comments discussed above in relation to the value formula for C2 are also applicable for each of the other cells within the report grid of the report. However, one can see that by including the row and column indices within the value formulas, the formulas are kept more concise, which may become significant for large reports.

In FIG. 12, the report grid that has been detected and stored in memory is indicated by boxed region 1200. The report grid of boxed region 1200 in memory includes the headers "2005" 1201 and "2006" 1204 for the dimension "Time" and also includes the headers "USA" 1210 and "Canada" 1212 as inner dimension members for "2005" 1201 as well as "USA" 1214 and "Canada" 1216 as inner dimension members for "2006" 1204. Additionally, the report grid of boxed region 1200 in memory also includes the headers "Budget" 1206 and "Actual" 1208. As shown the boxed region 1200 includes values for each of the cells at the row and column intersection for each of the headers.

FIG. 13 shows an example of an abbreviated screenshot illustrating a situation where the dimensions of "Time" and "Location" are not cross-joined as would be expected for this particular embodiment. In this situation, because of the blank between "2005" 1302 and "2006" 1304 but not between "2006" 1304 and "2007" 1306, "2005" 1302 is an orphaned axis with indeterminate orientation while "2006" 1304/"2007" 1306 is another orphaned axis with a down/row orientation. A report grid in memory, which is shown in boxed region 1300 is populated with values but is not consistent in relation to the dimension "Time" since no "2006" or "2007"

value is provided for "Canada" while no "2007" value is provided for 'USA' and no "2005" or "2006" value is provided for "Mexico." Therefore, the boxed region 1300 includes "USA" 1308 with values for "2005" 1302, "Canada" 1310 with values for "2005" 1302, "USA" 1312 with values for "2006" 1304, and "Mexico" 1314 with values for "2007" 1306. The boxed region 1300 also includes the dimension members "Budget" and "Actual" along the opposite axis and are represented by the headers "Budget" 1316 and "Actual" 1318.

FIGS. 14 and 15 show examples of abbreviated screenshots illustrating a situation where a new dimension member of "Location" from a different data source than the other dimension members of "Location" has been added. In this case as shown in FIG. 14, the dimension members of "Location" including "USA" represented by headers "USA" 1410 for "2005" 1402 and "USA" 1414 for "2006" 1404 and "Canada" represented by headers "Canada" 1412 for "2005" 1402 and "Canada" 1416 for "2006" 1404 are from "Cube 2" while "Washington" represented by header "Washington" 1418 has been added from "Cube 200." For embodiments where the dimension members for a given dimension must come from the same data source to ensure relatedness of the data values, then the report grid excludes the dimension member header "Washington" 1418 from the report grid of boxed region 1400 in memory. The boxed region 1400 of FIG. 14 also includes the column headers "Budget" 1406 and "Actual" 1408 of the dimension "Scenario."

As specifically shown in FIG. 15, the second report grid of boxed regions 1500 and 1501 includes only the header "Washington" 1518 on the row axis. The value formula for cells C6 and D6 exclude any reference to column A since "Washington" is not a member of an inner dimension with "Time" as an outer dimension. It should be noted that the second report includes the dimension "Scenario" including dimension member headers "Budget" 1506 and "Actual" 1508 even though they are separated by cells containing other data for the first report from the relevant cells for "Washington." Furthermore, "Budget" and "Actual" could have even been columns further to the right, such as columns L and M, rather than being the columns immediately adjacent to the column containing the header "Washington" 1518.

As shown in FIG. 15, the information of the first report in boxed region 1400 of FIG. 14 is absent from the boxed regions 1500 and 1501 of FIG. 15. The information absent from the second report includes the headers "2005" 1502, "2006" 1504, the headers of the inner dimension including "USA" 1510, "Canada" 1512, "USA" 1514, and "Canada" 1516 and the corresponding values for those headers.

FIG. 16 shows an example of an abbreviated screenshot where the user has selected and positioned a page filter. In this case, the user has selected a page filter of "Currency" and has chosen the filter to be "USD," or US dollars, which is represented by header "USD" 1618 within boxed region 1601. By applying the filter, the query to the data source looks for values in US dollars only. The data source has no data values for header "Canada" 1612 for "2005" 1602 and "Canada" 1616 for "2006" in US dollars so a zero is returned, such as the "0" 1620, for the cells at the intersection of headers "Budget" 1606 and "Actual" 1608 with "Canada" 1612 and "Canada" 1616. However, values in US dollars are present for "USA" so non-zero values are provided for the cells at the intersection of "USA" 1610 and "USA" 1614 with "Budget" 1606 and "Actual" 1608.

An example member formula for the page filter and the value formulas are provided below in Table 5, where it can be seen that the value formulas include references to the row and column indices where the page filter is located, e.g., B7, so that the page filter can be located based on the identifier within the member formulas for the page filter.

TABLE 5

Page Filter Member Formula and Value Formulas Present for FIG. 16

USD = CUBECELLMEMBER("Cube1", "Currency.USD")
C2 = CUBECELLVALUE("Cube1", C1, A2, B2, B7, "Measure.Value")
C3 = CUBECELLVALUE("Cube1", C1, A2, B3, B7, "Measure.Value")
C4 = CUBECELLVALUE("Cube1", C1, A4, B4, B7, "Measure.Value")
C5 = CUBECELLVALUE("Cube1", C1, A4, B5, B7, "Measure Value")
D2 = CUBECELLVALUE("Cube1", D1, A2, B2, B7, "Measure.Value")
D3 = CUBECELLVALUE("Cube1", D1, A2, B3, B7, "Measure.Value")
D4 = CUBECELLVALUE("Cube1", D1, A4, B4, B7, "Measure.Value")
D5 = CUBECELLVALUE("Cube1", D1, A4, B5, B7, "Measure.Value")

Figures 17, 18:
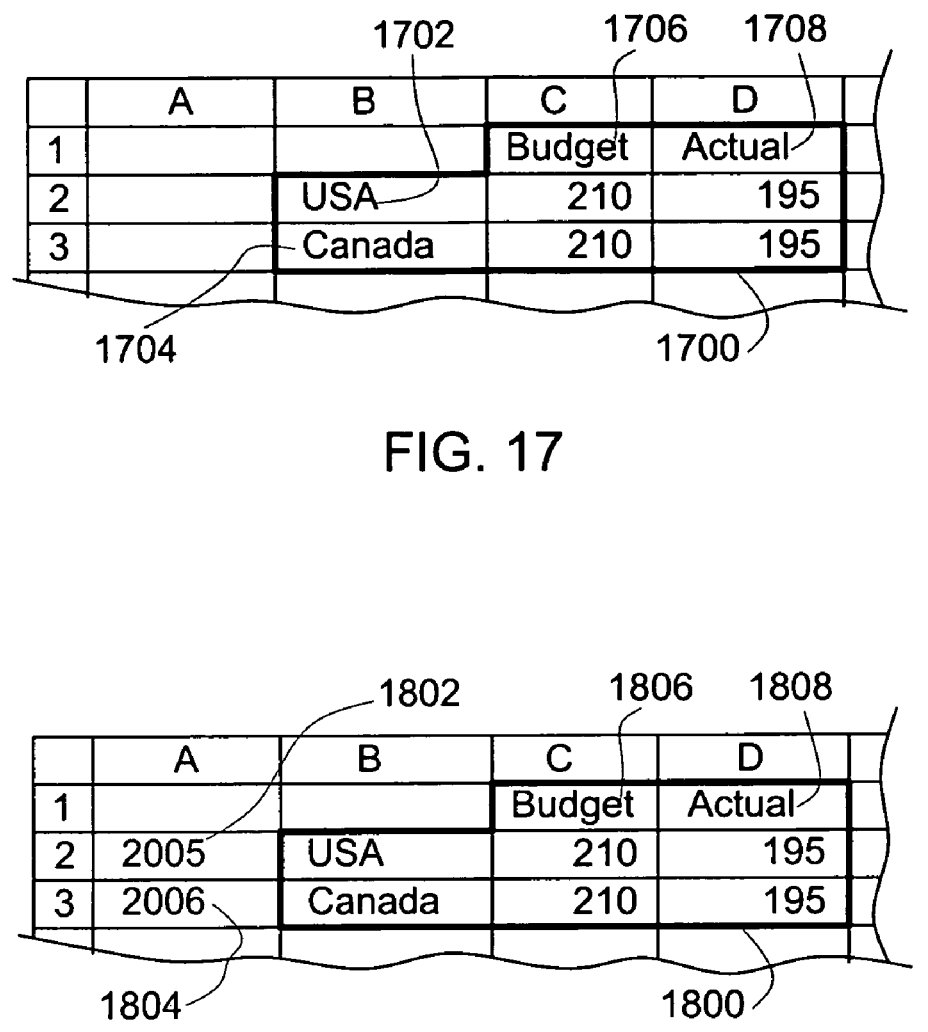

FIGS. 17 and 18 show examples of abbreviated screenshots showing an alternative sequence of intermediate steps for building the finished report of FIG. 12 where cross-joins are present to place two dimensions on one axis. As noted above, the outer dimension (e.g., "Time") may be selected and positioned first, and then the inner dimension (e.g., "Location") may be selected and positioned. As shown in the examples of FIGS. 17 and 18, the inner dimension may first be selected and positioned. The outer dimension may then be subsequently positioned. As shown in FIG. 17, the inner dimension(s) (e.g., dimension members for "Location") has been selected and positioned and is represented by headers "USA" 1702 and "Canada" 1704. The dimension of the opposite axis has also been selected and positioned and is represented by headers "Budget" 1706 and "Actual" 1708. The dimension "Measure" has also been selected so that values can be added and the report grid in memory as shown in boxed region 1700 is complete. It will be noted that the values populated are the cumulative values for multiple periods of time since the dimension "Time" has yet to be added.

Then, as shown in FIG. 18, the user may add the outer dimension of "Time" by selecting the two dimension members "2005" 1802 and "2006" 1804. Initially as shown in FIG. 18, upon adding the dimension members for "Time," the cross-joins of the horizontal axis have yet to be updated to space the outer dimension members appropriately and the values have yet to be updated. Thus, the report grid in memory as shown in boxed region 1800 remains the same as the report grid of boxed region 1700 of FIG. 17 including the headers "Budget" 1806 and "Actual" 1808. However, upon the next iteration of the operations of FIGS. 9 and 10, the operations of FIG. 10 are in an update mode in that replacement and new value formulas are generated based on the addition of the outer dimension members to thereby space "2006" 1804 from "2005" 1802 by an adequate number of blanks, one in the example shown, in order to repeat the inner dimension members for both "2005" 1802 and "2006" 1804, which results in value formulas referencing the key of both the dimension "Time" and the dimension "Location." Upon completing the update, the new values are displayed in each of the cells of the report grid of boxed region 1200 shown in FIG. 12.

As discussed above, a free form report is generated within a data array having rows and columns defining first and second axes and wherein dimension members for multiple dimensions have been added to the data array to produce dimension member headers at row and column locations that are represented by dimension member formulas. The free form report is generated by detecting the dimensions of axes for the report by scanning for intersections of the rows and columns having dimension member headers to find intersections having values represented by first or second dimension member formulas. The free form report is further generated by generating a first value formula for a first intersection of the data array for a chosen measure dimension, then determining any intersection points of adjacent columns and adjacent rows that have a matching "Measure" dimension member, and where no "Measure" dimension member header is present at an intersection, including a "Measure" dimension identifier in the value formula that represents the value for the intersection.

As further discussed above, during the scanning when generating the free form report, upon finding an intersection having a value represented by a first or second dimension member formula, it is determined whether any intersection points of adjacent columns have a value represented by a first or second dimension member formula that belongs to a same dimension as that for the current intersection point. Additionally, during the scanning, it is determined whether any intersection points of adjacent rows have a value represented by a first or second dimension member formula that belongs to the same dimension as that for the current intersection point, and it is determined whether a dimension member was found in a previous column or row or other data array dimension that constitutes an outer dimension member or whether a dimension member is found in a subsequent column or row or other data array dimension that constitutes an inner member. For outer members during the scanning, it is detected whether a number of blanks between the outer member dimension headers is correct relative to the number of inner member dimension headers, and in memory, the determined intersection points are marked as scanned in memory and the first set of members and the at least one second member are tracked in memory as corresponding to the first and second axes.

While the invention has been particularly shown and described with reference to various embodiments thereof, it will be understood by those skilled in the art that various other changes in the form and details may be made therein without departing from the spirit and scope of the invention. For example, although a user interface is described above to receive the user's selections of data source, dimensions, locations of headers, and the like, it is to be appreciated that the user may input the data from a data file which indicate user preferred an/or determined selections.

What is claimed is:

1. A method of generating a free form report within a data array having rows and columns providing a first axis and a second axis, comprising:

receiving a selection of at least one first dimension member that is of a first data source and that is for the first axis;

receiving a location within the data array for a first dimension member header for the selected first dimension member;

in response to the selection of the first dimension member, generating a first dimension member formula, stored in the data array, that is representative of the first dimension member header and that includes a first dimension member identifier that relates to the first data source and a data source identifier that specifies a source of the dimension member as the first data source;

receiving a selection of a second dimension member that is of a second data source and that is for the second axis;

receiving a location within the data array for a second dimension member header for the selected second dimension member;

receiving a selection of a third dimension member for the first axis and receiving a location within the data array for a third dimension member header for the selected third dimension member that is adjacent to and repeated for each of the first dimension member headers;

selecting a first dimension and selecting the at least one first dimension member from the first dimension, and selecting a second dimension different from the first dimension and selecting the second dimension member from the second dimension, and wherein the first dimension member formula includes an identifier of the first dimension and the second dimension member formula includes an identifier of the second dimension, wherein the at least one first dimension member includes at least two dimension members where each of the at least two dimension members has a dimension member header located on the data array, and in response to the selection of the second dimension member, generating a second dimension member formula, stored in the data, array that is representative of the second dimension member header and that includes a second dimension member identifier that relates to the second data source and a data source identifier that specifies a source of the dimension member as the second data source;

in response to the selection of the third dimension member, generating a dimension member formula, stored in the data array, representative of each of the third dimension member headers that includes a third dimension member identifier that relates to the first data source;

receiving a selection of a "measure" dimension member having an associated "measure" dimension member identifier;

scanning for boundaries of a grid of the free form report based on the first dimension member formula of the first dimension header and the second dimension member formula of the second dimension header;

in response to generating the first dimension member formula and the second dimension member formula, scanning the boundaries of the grid of the free form report to generate a value formula that represents a value to be displayed for an intersection of the row and column where the first and second member dimension headers are located, and the value formula references the first dimension member identifier of the first data source and the second dimension member identifier of the second data source for the intersection to which the value formula corresponds, the first data source is distinct from the second data source, where the value formula is based on references for the intersection and the measure dimension, wherein generating the value formula comprises including a reference to the third dimension member identifier for the intersection to which the value formula corresponds, wherein scanning for boundaries further comprising prior to generating the value formula, detecting dimensions of the first and second axes by scanning cells of the data array located at intersections of the rows and the columns and that contain dimension member headers to find dimension member formulas including the identifiers of the first and second dimensions, wherein detecting a dimension includes, in response to finding a cell having a value represented by at least one of the first dimension member formula and the second dimension member formula:

determining whether any cells of adjacent columns have a value represented by the first dimension member formula and/or the second dimension member formula that have an identifier that is the same as the identifier for the dimension member formula in the current cell, determining whether any cells of adjacent rows have a value represented by the first dimension member formula and/or the second dimension member formula that have an identifier that is the same as the identifier for the dimension member formula in the current cell, indicating the determined cell as scanned; and tracking the dimensions corresponding to the identifiers found during the scanning of cells located at intersections of adjacent rows and columns as corresponding to the first and second axes.

2. The method of claim 1, wherein the second dimension member is a "Measure" dimension member and wherein the second dimension member identifier is a "Measure" dimension member identifier.

3. The method of claim 1, further comprising:
receiving a selection of a page filter that is associated with a page filter identifier that relates to the first data source; and
wherein generating the value formula includes referencing the page filter identifier.

4. The method of claim 3, wherein referencing the first and second dimension member identifiers each comprises referring to an intersection of a row and a column indicator for the corresponding first dimension member formula and the second dimension member formula that contain the first and second dimension member identifiers.

5. The method of claim 1, wherein each value formula includes a data source identifier specifying a source of a "Measure" as one of the first data source and the second data source.

6. The method of claim 1, further comprising:
upon determining the cells located at intersections of adjacent rows and columns that have values represented by formulas that have an identifier for the same dimension as the current cell within the scan order, then detecting from the dimension member formulas of the dimensions whether cross-joins of dimensions on one axis producing outer dimension members for one dimension of the one axis and inner dimension members for another dimension of the one axis meet pre-defined constraints.

7. A computer readable storage medium having computer-executable instructions for generating a free form report within a data array having rows and columns defining first and second axes by performing steps comprising:
receiving a selection of at least one first dimension member that is of a first data source and that is for the first axis;
receiving a location within the data array for a first dimension member header for the selected first dimension member;
in response to the selection of the first dimension member, generating a first dimension member formula, stored in the data array, that is representative of the first dimension member header and that includes a first dimension member identifier that relates to the first data source and a data source identifier that specifies a source of the dimension member as the first data source;
receiving a selection of a second dimension member that is of a second data source and that is for the second axis;
receiving a location within the data array for a second dimension member header for the selected second dimension member;
receiving a selection of a third dimension member for the first axis and receiving a location within the data array for a third dimension member header for the selected third dimension member that is adjacent to and repeated for each of the first dimension member headers;
selecting a first dimension and selecting the at least one first dimension member from the first dimension, and selecting a second dimension different from the first dimension and selecting the second dimension member from the second dimension, and wherein the first dimension member formula includes an identifier of the first dimension and the second dimension member formula includes an identifier of the second dimension, wherein the at least one first dimension member includes at least two dimension members where each of the at least two dimension members has a dimension member header located on the data array, and in response to the selection of the second dimension member, generating a second dimension member formula, stored in the data array, that is representative of the second dimension member header and that includes a second dimension member identifier that relates to the second data source and a data source identifier that specifies a source of the dimension member as the second data source;

in response to the selection of the third dimension member, generating a dimension member formula, stored in the data array, representative of each of the third dimension member headers that includes a third dimension member identifier that relates to the first data source;

receiving a selection of a "measure" dimension member having an associated "measure" dimension member identifier;

scanning for boundaries of a grid of the free form report based on the first dimension member formula of the first dimension header and the second dimension member formula of the second dimension header;

in response to generating the first dimension member formula and the second dimension member formula, scanning the boundaries of the grid of the free form report to generate a value formula that represents a value to be displayed for an intersection of the row and column where the first and second member dimension headers are located, and the value formula references the first dimension member identifier of the first data source and the second dimension member identifier of the second data source for the intersection to which the value formula corresponds, the first data source is distinct from the second data source, where the value formula is based on references for the intersection and the measure dimension, wherein generating the value formula comprises including a reference to the third dimension member identifier for the intersection to which the value formula corresponds, wherein scanning for boundaries further comprising prior to generating the value formula, detecting dimensions of the first and second axes by scanning cells of the data array located at intersections of the rows and the columns and that contain dimension member headers to find dimension member formulas including the identifiers of the first and second dimensions, wherein detecting a dimension includes, in response to finding a cell having a value represented by at least one of the first dimension member formula and the second dimension member formula:

determining whether any cells of adjacent columns have a value represented by the first dimension member formula and/or the second dimension member formula that have an identifier that is the same as the identifier for the dimension member formula in the current cell, determining whether any cells of adjacent rows have a value represented by the first dimension member formula and/or the second dimension member formula that have an identifier that is the same as the identifier for the dimension member formula in the current cell, indicating the determined cell as scanned; and tracking the dimensions corresponding to the identifiers found during the scanning of cells located at intersections of adjacent rows and columns as corresponding to the first and second axes.

8. The computer readable storage medium of claim 7, wherein each value formula includes a reference to a page filter identifier.

9. The computer readable storage medium of claim 7, wherein referencing the first and second dimension member identifiers comprises referring to the row and column position for each first and second dimension member formula where the row and column position of the first and second dimension member identifiers provides for the intersection for which the value formula corresponds.

10. The computer readable storage medium of claim 7, wherein generating the set of value formulas comprises including a data source identifier specifying whether a "Measure" is from the first data source or the second data source.

11. A computer system for building a free form report in a data array including rows and columns that define first and second axes, comprising:
a physical network connection that establishes a logical connection to a first data source that provides dimensions including "Measures" for the free form report, and, to a second data source;
a user input device;
a display system;
a processor in communication with the physical network connection, the user input device, and the display system, the processor executing instructions that:
provide via the display system available dimension members from the first data source;
through the user input device, receive a selection of at least one first dimension member that is of a first data source and that is for the first axis and a location within the data array for a first dimension member header for the selected first dimension member;
in response to the selection of the first dimension member, generate a first dimension member formula, stored in the data array, that is representative of the first dimension member header and that includes a first dimension member identifier that relates to the first data source and a data source identifier that specifies a source of the dimension member as the first data source;
provide via the display system available dimension members from the second data source;
through the user input device, receive a selection of a second dimension member that is of a second data source and that is for the second axis and a location within the data array for a second dimension member header for the selected second dimension member;
through the user input device, receive a selection of a third dimension member for the first axis and receiving a location within the data array for a third dimension member header for the selected third dimension member that is adjacent to and repeated for each of the first dimension member headers;
through the user input device, receive a selection of a first dimension and selection of the at least one first dimension member from the first dimension, and selection of a second dimension different from the first dimension and selection of the second dimension member from the second dimension, and wherein the first dimension member formula includes an identifier of the first dimension and the second dimension member formula includes an identifier of the second dimension, wherein the at least one first dimension member includes at least two dimension members where each of the at least two dimension members has a dimension member header located on the data array, and
in response to the selection of the second dimension member, generate a second dimension member formula, stored in the data array, that is representative of the second dimension member header and that includes a second dimension member identifier that relates to the second data source and a data source identifier that specifies a source of the dimension member as the second data source;
in response to the selection of the third dimension member, generate a dimension member formula, stored in the data array, representative of each of the third dimension member headers that includes a third dimension member identifier that relates to the first data source;
through the user input device, receive a selection of a "measure" dimension member having an associated "measure" dimension member identifier;
scan for boundaries of a grid of the free form report based on the first dimension member formula of the first dimension header and the second dimension member formula of the second dimension header;
in response to generating the first dimension member formula and the second dimension member formula, scan the boundaries of the grid of the free form report to generate a value formula that represents a value to be displayed for an intersection of the row and column where the first and second member dimension headers are located, and the value formula references the first dimension member identifier of the first data source and the second dimension member identifier of the second data source for the intersection to which the value formula corresponds, the first data source is distinct from the second data source, where the value formula is based on references for the intersection and the measure dimension, wherein generating the value formula comprises including a reference to the third dimension member identifier for the intersection to which the value formula corresponds, wherein scanning for boundaries further comprising prior to generating the value formula, detecting dimensions of the first and second axes by scanning cells of the data array located at intersections of the rows and the columns and that contain dimension member headers to find dimension member formulas including the identifiers of the first and second dimensions, wherein detecting a dimension includes, in response to finding a cell having a value represented by at least one of the first dimension member formula and the second dimension member formula:
determine whether any cells of adjacent columns have a value represented by the first dimension member formula and/or the second dimension member formula that have an identifier that is the same as the identifier for the dimension member formula in the current cell,
determine whether any cells of adjacent rows have a value represented by the first dimension member formula and/or the second dimension member formula that have an identifier that is the same as the identifier for the dimension member formula in the current cell,
indicate the determined cell as scanned; and
track the dimensions corresponding to the identifiers found during the scanning of cells located at intersections of adjacent rows and columns as corresponding to the first and second axes.

* * * * *